United States Patent Office 3,825,598
Patented July 23, 1974

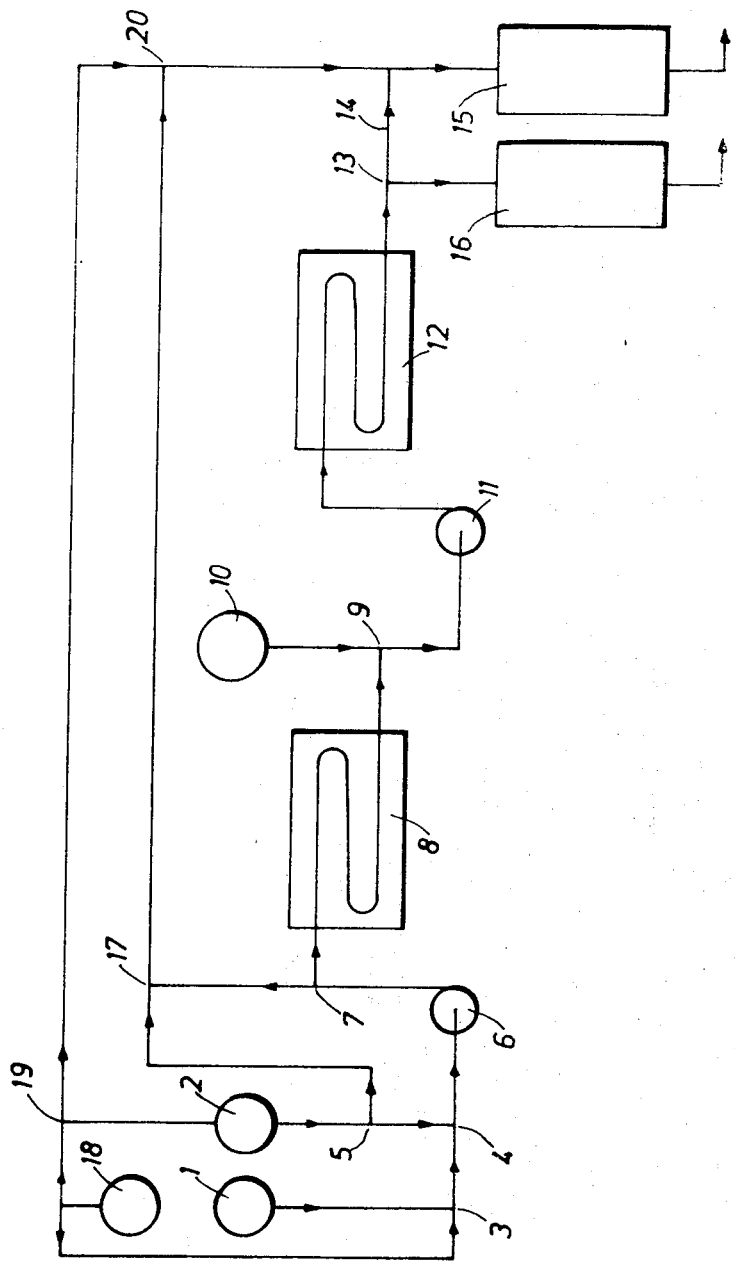

3,825,598
PROCESS FOR THE PRODUCTION OF
POLYAMINES
Willi Eifler, Schildgen, and Josef Finkel, Cologne, Germany, assignors to Bayer Aktiengesellschaft, Leverkusen, Germany
Filed June 21, 1972, Ser. No. 265,054
Claims priority, application Germany, July 7, 1971,
P 21 33 870.5
Int. Cl. C07c 85/08
U.S. Cl. 260—570 D                    7 Claims

ABSTRACT OF THE DISCLOSURE

A continuous process for the production of diamine-rich mixtures of polyamines of the polyamino-polyaryl-polymethylene type obtained by condensing aromatic amines with formaldehyde or formaldehyde precursors.

This invention relates to a continuous process for the production of diamine-rich mixtures of polyamines of the polyamino-polyaryl-polymethylene-type by condensing aromatic amines with formaldehyde in the presence of acidic catalysts.

It is known that, in the acid condensation of aromatic amines with formaldehyde to form polyamines, the yield of diamines can be improved by increasing the ratio of amine to aldehyde. An amine:aldehyde molar ratio of from about 3:1 to 4:1 is generally used. Adopting a continuous procedure, all the amine used is initially mixed with the catalyst and the heat of neutralization that is liberated is dissipated in a heat exchanger. The aldehyde is then added to the cooled mixture, the heat that is liberated during the resulting precondensation reaction is removed in a second heat exchanger, and the mixture is subsequently heated to a temperature above 80° C. in order to effect rearrangement of the precondensation products formed. This is followed by working up under alkaline conditions.

The disadvantages of such processes as these are the low volume-time yield in the condensation part of the apparatus, the considerable energy expended during cooling and heating, and the fact that when there is a low amine:catalyst ratio, more water has to be introduced in order to maintain the amine/catalyst mixture in the liquid state. Because of the large excess of amine, those areas of the apparatus used to produce the amine/catalyst mixture and to carry out the precondensation reaction must be made larger for a given output per unit of time than for the same output of a polyamine mixture containing less diamines. The energy required comprises firstly cooling energy for the mixture as a whole until the precondensation reaction is complete and secondly heating energy in order to reach the rearrangement temperature.

It has now been found that, although it is not possible to operate without a high amine/catalyst excess in the production of a polyamine rich in diamines, this excess need not be present as early as when the aldehyde is added. It is sufficient for rearrangement of the precondensation products to take place in a medium diluted with excess amine/catalyst mixture. An amine:aldehyde ratio of at most 2:1 is sufficient for the preparation of the precondensation products.

Accordingly, the present invention relates to a process for the production of polyamines comprising condensing an aromatic amine with formaldehyde in a molar ratio of from about 15:1 to about 2:1, using a quantity of an acidic catalyst corresponding to a molar ratio of amine to catalyst of from about 10:1 to about 1:1, and subsequently working up the reaction mixture under alkaline conditions, wherein a portion of the initially prepared amine/catalyst mixture is cooled to a temperature below about 40° C., is allowed to react with the formaldehyde while cooling in a reactor in which a temperature of about 60° C. is not exceeded, and is thereafter introduced into a residence reactor heated to at least about 80° C. into which the uncooled part of the amine/catalyst mixture is simultaneously introduced.

Turning now to the schematic diagram, the apparatus required for carrying out the process according to the invention comprises two supply containers 1 and 2 respectively, for aromatic amine and catalyst whose output conduits merge at 4 and lead to a common delivery pump 6 whose output end is connected to a branch or junction 7 from which a pipe leads, via a condenser 8, to a mixer 9 which is also connected to a supply container 10 for formaldehyde and from which a conduit leads, via a pump 11, to a reactor 12, whose output conduit 14 leads to a residence reactor 15. Another conduit leads directly from the junction 7 to a residence reactor 15 through mixing stations 17 and 20.

An apparatus for carrying out one special embodiment of the process according to the invention, has a branch 13 on the output conduit 14 of the reactor 12, the branch 13 leading through a conduit into a second reactor 16.

To carry out other embodiments of the process according to the invention, the apparatus comprises another supply container 18 for aromatic amine, from which conduits lead on the one hand to a mixing station 3 and on the other hand to a mixing station 19. On the other side, the mixing station 19 is connected through a conduit to the supply container 2, while its output end, leads to the residence reactor 15 via the mixing station 20.

Finally, for another special embodiment of the process according to the invention, the apparatus comprises another junction 5, from which a conduit leads to the mixing station 17.

The invention also relates to an apparatus for carrying out the process according to the invention, which apparatus comprises separate supply containers for aromatic amine and catalyst from which conduits lead to a common delivery pump followed by a condenser from which a conduit leads to a mixer which is connected to a supply container for formaldehyde, and whose output end is connected to a reactor whose output conduit leads to a residence reactor, distinguished by the fact that a conduit branches off between the delivery pump 6 and the condenser 8, leading either directly into the reactor 15, or before the reactor 15, into the feed conduit 14 thereof.

In the practical application of the process according to the invention, the measured, regulated flows of amine and catalyst issuing from the containers 1 and 2 are combined at the mixing station 4. The pump 6 delivers the mixture to the junction 7 from which one part is directed, without cooling, into the residence reactor 15, while the remaining part gives off the heat of neutralization in the condenser 8, and is mixed in the mixer 9 with the optionally cooled formaldehyde stored in the container 10. The pump 11 delivers the exothermically reacting mixture thus obtained, through the cooled reactor 12 into the heated residence reactor 15 in which the precondensation products formed in the reactor 12 are rearranged and reacted with excess amine/catalyst mixture to form the end products or their ammonium salts, which are converted into the corresponding polyamines in the usual way by alkaline working-up.

The cooled reactors 8 and 12 are preferably conventional double-tube condensers. The average residence time in these reactors is generally from about 5 to about 60 seconds. The reactors 15 and 16 are preferably conventional kettle reactors. The average residence time in these reactors is generally from about 30 to about 360 minutes, preferably from about 60 to about 120 minutes.

In the process according to the invention, the streams of amine and catalyst leaving the supply containers 1 and 2 are regulated in such a way that, after mixing at the mixing station 4, the components are present in an amine:catalyst molar ratio of from about 10:1 to about 1:1, preferably from about 3:1 to about 1:1.

The product streams are regulated at the junction 7 in such a way that the quantitative ratio of the uncooled amine/catalyst mixture directly entering the residence vessel 15 to the amine/catalyst mixture passed through the condenser 8 is from about 1:5 to about 10:1, preferably from about 1:2 to about 4:1.

The quantity of formaldehyde introduced at the mixing station 9, which preferably functions on the principle of a jet stream mixer, is so adjusted that the molar ratio of the total quantity of amine used in the process according to the invention to formaldehyde is from about 15:1 to about 2:1, preferably from about 4:1 to about 2:1.

The product temperature at the outlet of the condenser 8 is from about 0° C. to about 40° C., preferably from about 10° C. to about 25° C. Cooling of the cooled reactor 12 is so regulated that the temperature of the reaction mixture does not exceed about 60° C., preferably about 40° C. In general, the temperature at the outlet of the cooled reactor 12 is from about 35° C. to about 40° C. The temperature prevailing in the residence reactor 15 is at least about 80° C. The chemical reaction in the residence reactor is preferably carried out at from about 80° C. to about 110° C., most preferably at from about 95° C. to about 100° C.

In one particular embodiment of the process according to the invention, a component stream can be branched off at the junction 13 and can be directly reacted in another residence reactor 16, the lower amine:formaldehyde ratio prevailing therein leading to formation of a product which contains more higher-nuclear components than the product produced in the residence reactor 15.

Another particular embodiment of the process according to the invention enables mixed condensation products to be produced. For this purpose, amines taken from the containers 1 and 18 (when more than two amines are used, correspondingly more containers are also employed) can be mixed at the mixing station 3, have the catalyst added to them at 4 and then be further reacted as described above. Alternatively, with greater advantage, the second amine from container 18 can be fed directly through the mixing station 20 into the residence reactor 15, with or without the addition of catalyst at the mixing station 19. In this particular modification of the process according to the invention, the yield of asymmetrical diamines is considerably increased.

When the amine:catalyst ratio is relatively low, there is a danger of obstruction attributable to precipitating amine salt in the cooled parts of the apparatus used for carrying out the process according to the invention. This danger can readily be overcome, however, by adding part of the catalyst through the junction 5 to the uncooled component stream at the mixing station 17. The molar ratio of the catalyst present in the original amine/catalyst mixture to the catalyst subsequently introduced is from about 1:0 to about 1:10. However, the overall molar ratio of amine to catalyst is from about 10:1 to about 1:1 in this embodiment as well.

The process according to the invention can be carried out with any aromatic amines such as, for example, aniline; o-, m-, or p-chloroaniline; o-, m-, or p-bromoaniline; o-, m-, or p-anisidine; o-, m-, or p-phenetidine; o-, m-, or p-toluidine; o-, m-, or p-ethylaniline; o-, m-, or p-isopropylaniline; o-, m-, or p-xylidines; a- or β-naphthylamine; o-, m-, or p-benzylaniline; o-, m-, or p-cyclohexylaniline; 2,6-dimethylaniline; 2,6 - diethylaniline; 2,6 - diisopropylaniline, 2,4- or 2,6-diaminotoluene; o-, m-, or p-diaminobenzene; N-methyl-, N-ethyl-, N-propyl-, N-butyl-, N-hydroxyethyl- or N-chloroethyl-aniline; o-, m-, or p-methyl-N-methylaniline; o-, m-, or p-methyl-N-ethylaniline; o-, m-, or p-chloro-N-methylaniline; o-, m-, or p - chloro - N-ethylaniline; or any mixtures of the aforementioned amines, or mixtures of the aforementioned amines with their formaldehyde condensation products of the diaryl methane type. Aniline is preferably used as the starting amine in the process according to the invention.

The formaldehyde used in the process according to the invention can be employed in the form of an aqueous or aqueous-methanolic solution, or even in the form of a formaldehyde-donor, for example, methylal, trioxane or paraformaldehyde. An aqueous formaldehyde solution is preferably used in the process according to the invention.

Any acid-reacting catalyst, for example, hydrochloric acid, sulphuric acid, hydrobromic acid, gaseous hydrogen chloride, or acetic acid, etc., can be used in the process according to the invention. Aqueous hydrochloric acid or acetic acid is preferably used as catalyst in the process according to the invention.

The process according to the invention affords the following advantages over conventional processes:

(1) Saving of cooling energy.—Only part of the amine/catalyst mixture is cooled. The dimensions of condenser 8 can be correspondingly diminished.

(2) Saving of heating energy.—Part of the amine/catalyst mixture does not have to be cooled, and is used to heat the mixture as a whole in the residence reactor 15.

(3) The simultaneous production of polyamines relatively rich in diamines, i.e., binuclear condensation products, and of polyamines less rich in diamines but with a higher content of higher-nuclear condensates, can be achieved with simple means.

(4) Increased volume-time yield.—Because of the smaller flow of material between the junction 7 and the output end of the cooled reactor 12 compared with conventional processes for the same overall conversion, the dimensions of corresponding parts of the apparatus can be reduced.

(5) Isomer distribution.—The aforementioned measured introduction of part of the catalyst into the uncooled stream of amine/catalyst mixture provides for a lower amino:catalyst ratio without any danger of obstruction, which in turn enables polyamines rich in 4,4'-isomers to be produced.

(6) Effluent.—Hitherto, the aforementioned danger of obstruction has been overcome in conventional processes by the introduction of more water. The introduction of more water, which only increases the quantity of effluent, is no longer necessary in the process according to the invention, for the reasons explained above.

The primary polyamines obtainable by the process according to the invention, more particularly aniline-formaldehyde condensates obtainable by the process according to the invention, are valuable starting materials for production of the corresponding polyisocyanates by phosgenating the polyamines by conventional methods. The N-substituted end products obtained when N-substituted aromatic amines are used, either on their own or in combination, can be used for example in the same way as primary polyamines for the production of polyureas or reaction with isocyanate.

The process according to the invention is illustrated by the following examples. The hydrochloric acid used and the formalin are both in the form of 30% by weight aqueous solutions and all other parts and percentages are by weight unless otherwise specified.

EXAMPLES

Example 1

About 4 parts by volume of aniline from container 1 and 2 parts by volume of hydrochloric acid from container 2 are mixed at the mixing station 4 and divided at the junction 7 in a ratio of about 1:1. About 2 parts by volume of hydrochloric acid are added to one half of the mixture at the mixing station 17, and the resulting product flows without being cooled, and having a temperature of approximately 80° C., into the output conduit 14 of the cooled reactor 12. The other half of the stream divided at the junction 7 is cooled to about 10° C. in the condenser 8 and then about 1 part by volume of formalin is added to it as the mixing station 9. The resulting exothermically reacting mixture is pumped by the pump 11 through the cooled reactor 12 which is so operated that the product at its outlet end has a temperature of about 35° C. Following combination with the uncooled amine/catalyst mixture, the mixture flows into the kettle reactor 15 kept at from about 100° C. to about 102° C. After an average residence time of about 1 hour in the reactor 15, the acid condensation product thus obtained is made alkaline with sodium hydroxide in a manner known per se and, following phase separation, the organic phase is freed by distillation from adhering water and excess aniline. A polyamine of the following constitution is obtained.

Diamine content _____ 86%.
Triamine content _____ 11%.
Tetramine content _____ 2%.
Pentamine content _____ Less than 1%.
Viscosity at 85° C. _____ 20 cp.
Yield _____ 48% based on the aniline used.

The diamines comprise 82% of 4,4'-diaminodiphenylmethane and 4% of 2,4-diaminodiphenylmethane.

Example 2

The procedure is as in Example 1, except that no additional hydrochloric acid is added at the mixing station 17. A polyamine is obtained whose composition is similar to that of the polyamine of Example 1, except that the diamine content comprises 78% of 4,4'-diaminodiphenylmethane, 8% of 2,4'-diaminodiphenylmethane and 0.2% of 2,2'-diaminodiphenylmethane.

Example 3

About 2 parts by volume of aniline from container 1 and about 1 part by volume of concentrated aqueous hydrochloric acid from container 2 are mixed at the station 4 and delivered through the junction 7 to the condenser 8. About 1 part by volume of aqueous formaldehyde is added as in Example 1, followed by further processing as in Example 1. At the same time, about 2 parts by volume of o-toluidine from container 18, and about 1 part by volume of hydrochloric acid from container 2 are mixed at the station 19 and delivered uncooled into the output pipe 14 of the cooling recator 12. Further reaction takes place as in Example 1. A polyamine of the following constitution is obtained.

| | Percent |
|---|---|
| Diaminodiphenylmethane conent | 23 |
| Di-o-toluidyl-methane content | 5 |
| Aminophenyl-o-toluidyl-methane content | 65 |
| Triamine content | 7 |
| Yield, based on the amines used | 53 |

Example 4

The procedure is as in Example 3, except that the order of adding the amines is changed. The polyamine thus obtained is characterized as follows:

| | Percent |
|---|---|
| Diaminodiphenylmethane content | 5 |
| Di-o-toluidyl-methane content | 49 |
| Aminophenyl-o-toluidyl-methane conent | 37 |
| Triamine content | 9 |
| Yield, based on the amines used | 53 |

Example 5

About 2 parts by volume of aniline from container 1 and about 2 parts by volume of o-toluidine from container 18 are mixed at the station 3 and the resulting mixture is combined with about 2 parts by volume of hydrochloric acid from container 2 at the mixing station 4. The product stream is divided at the junction 7 in a ratio of 1:1. One half flows through 17 and 20 into the output conduit 14 of the cooled reactor 12, while about 1 part by volume of aqueous formaldehyde is added to the other part as in Example 1, and the resulting combination is then further treated as described in that Example. The further reaction takes place as in Example 1. A polyamine of the following constitution is obtained:

| | Percent |
|---|---|
| Diaminodiphenylmethane content | 16 |
| Di-o-toluidyl-methane content | 34 |
| Aminophenyl-o-toluidyl-methane content | 42 |
| Triamine content | 8 |
| Yield, based on the amines used | 56 |

Example 6

About 2 parts by volume of aniline from container 1 and about 1 part by volume of hydrochloric acid from container 2 are mixed at the junction 4, and delivered through the junction 7 to the condenser 8. About 1 part by volume of aqueous formaldehyde is then added as in Example 1, followed by further processing as described in Example 1. At the same time, about 2 parts by volume of N-methylaniline from container 18 and about 1 part by volume of hydrochloric acid from container 2 are mixed at the junction 19 and delivered uncooled into the output conduit 14 of the cooled reactor 12. The further reaction takes place as in Example 1. A polyamine of the following constitution is obtained:

| | Percent |
|---|---|
| Diaminodiphenylmethane content | 20 |
| Di-(N-methylamino)-diphenylmethane content | 6 |
| Aminophenyl - N - methylaminophenylmethane content | 65 |
| Triamine content | 9 |
| Yield, based on the amines used | 54 |

Example 7

The procedure is as in Example 6, except that the order of adding the amines is changed. The polyamine thus obtained is characterized as follows:

| | Percent |
|---|---|
| Diaminodiphenylmethane content | 7 |
| Di-(N-methylamino)-diphenylmethane content | 47 |
| Aminophenyl - N - methylaminophenylmethane content | 35 |
| Triamine content | 11 |
| Yield, based on the amines used | 56 |

Example 8

A solution of about 200 parts of the polyamine obtained in accordance with Example 1 in about 1300 parts by volume of chlorobenzene is allowed to flow with cooling and stirring into a solution, cooled to about −10° C., of about 320 parts of phosgene in about 1200 parts by volume of chlorobenzene. The rate at which the addition is made is so adjusted that the temperature does not exceed about 30° C. The mixture is then heated slowly to about 100° C., while more gaseous phosgene is introduced, a temperature of about 100° C. being maintained for about 2 hours. Excess phosgene is removed by applying a water jet vacuum, after which the solvent is distilled off in vacuo, leaving behind approximately 240 parts of a polyisocyanate mixture eminently suitable for the production of polyurethanes. The content of di-, tri-, tetra- and penta-nuclear components corresponds to the composition of the polyamine mixture used.

What is claimed is:

1. A process for the continuous production of polyamines comprising condensing an aromatic amine with formaldehyde in a molar ratio of from about 15:1 to about 2:1, using a quantity of acid catalyst corresponding to a molar ratio of amine to catalyst of from about 10:1 to about 1:1 and subsequently working up the reaction mixture under alkaline conditions, wherein the aromatic amine and the acid catalyst are admixed, the initially prepared amine/catalyst mixture is separated into a first portion and a second portion, the first portion is cooled to a temperature below about 40° C., the cooled first portion is reacted with the formaldehyde while cooling in a reactor in which a temperature of about 60° C. is not exceeded, in order to form a reaction mixture and the reaction mixture is thereafter introduced into a residence reactor heated to at least about 80° C., into which the uncooled second portion of the amine/catalyst mixture is simultaneously introduced.

2. The process of Claim 1, wherein the weight ratio of the uncooled amine/catalyst mixture to the cooled amine/catalyst mixture is from about 1:5 to about 10:1.

3. The process of Claim 1, wherein an additional quantity of catalyst is added to the uncooled amine/catalyst mixture, the ratio of the catalyst present in the original amine/catalyst mixture to the quantity of catalyst subsequently introduced corresponding to a molar ratio of from about 1:0 to about 1:10.

4. The process of Claim 1, wherein a portion of the reaction mixture, obtained from the cooled amine/catalyst mixture reacted with formaldehyde, is introduced together with the uncooled amine/catalyst mixture into a residence reactor, while another portion of the reaction mixture is reacted in the absence of admixture with uncooled amine/catalyst mixture in another residence reactor.

5. The process of Claim 1, wherein one or more other aromatic amines are added in measured quantities to the system to produce mixed polyamines, the measured addition being made either to the amine/catalyst mixture as a whole or to the uncooled amine/catalyst mixture.

6. The process of Claim 1, wherein hydrochloric acid or acetic acid is used as the catalyst.

7. The process of Claim 1, wherein aniline is used as the aromatic amine.

References Cited
UNITED STATES PATENTS

| | | | |
|---|---|---|---|
| 3,297,759 | 1/1967 | Curtiss et al. | 260—570 |
| 3,367,969 | 2/1968 | Perkins | 260—570 |

FOREIGN PATENTS

| | | | |
|---|---|---|---|
| 1,183,153 | 3/1970 | Great Britain | 260—570 |

ROBERT V. HINES, Primary Examiner

U.S. Cl. X.R.

23—288 L; 260—77.5 CH, 453 AM